UNITED STATES PATENT OFFICE.

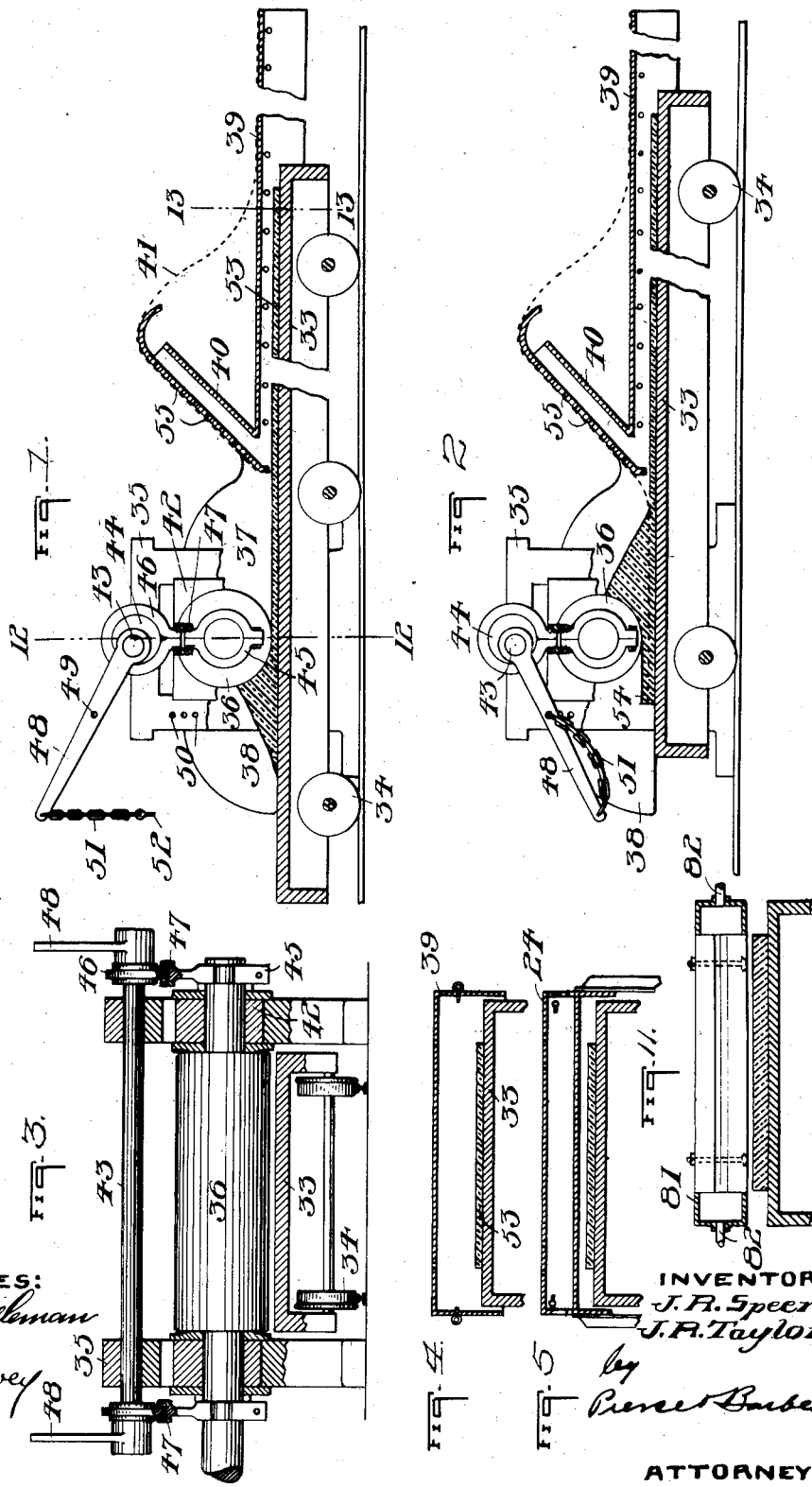

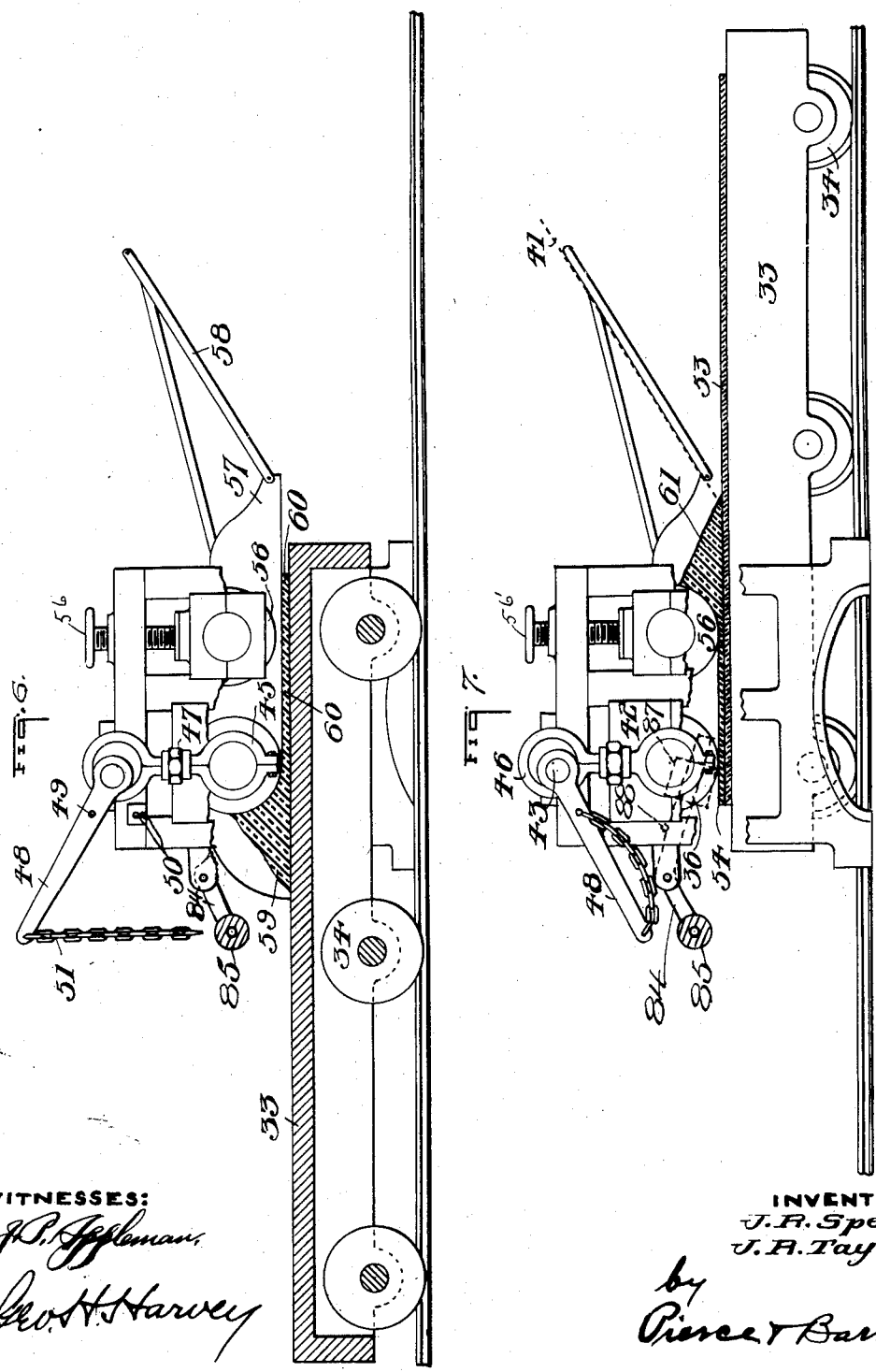

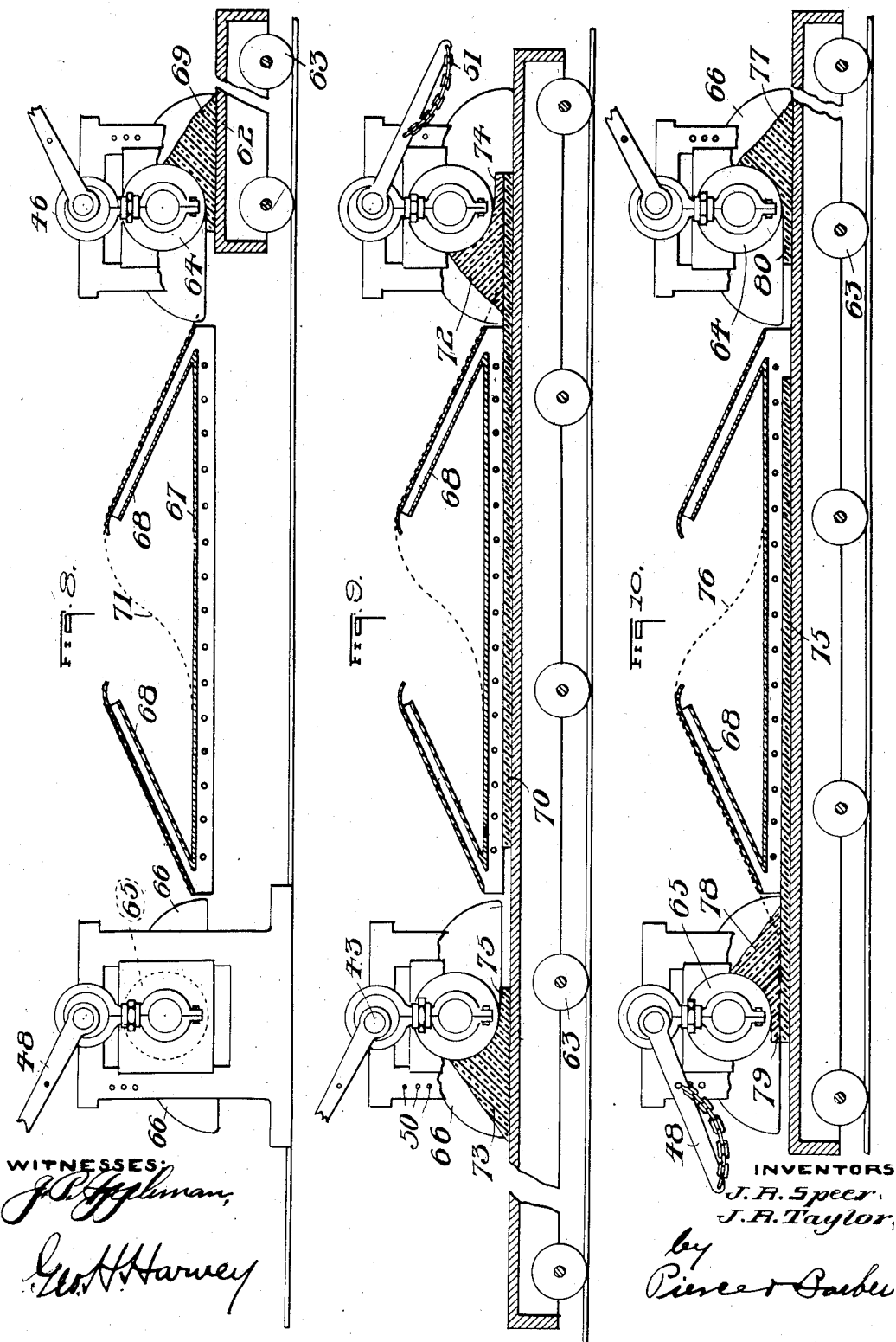

JAMES RAMSEY SPEER AND JAMES RICHARDSON TAYLOR, OF PITTSBURG, PENNSYLVANIA.

APPARATUS FOR AND METHOD OF MANUFACTURING WIRE-GLASS.

No. 906,952.  Specification of Letters Patent.  Patented Dec. 15, 1908.

Application filed April 27, 1905. Serial No. 257,571.

*To all whom it may concern:*

Be it known that we, JAMES RAMSEY SPEER and JAMES R. TAYLOR, citizens of the United States, residing at Pittsburg, county of Allegheny, and State of Pennsylvania, have invented or discovered new and useful Improvements in Methods of and Apparatus for Manufacturing Wire-Glass, of which the following is a specification.
Our invention relates to the method of making what is known to the trade as wire-glass, that is, glass having within it a trellis or equivalent metallic open work.

Our invention also relates to apparatus for the manufacture of such glass.

We cause by the travel of one element of our apparatus a layer of glass to be progressively applied to a horizontal table, which may be stationary or the traveling element. After this layer of glass has been applied to the table for a sufficient distance to make a sheet of glass of the desired length, a second layer of glass is by the travel of one of said elements applied on the surface of the layer on the table by a progressive movement of the glass in a direction the opposite of that by which the first layer was applied to the table, a trellis being incorporated between the two layers simultaneously with the said progressive movement of the second layer. Preferably the trellis is inserted at the junction of the first layer and the progressing front of the second layer in order that it may not be exposed to the oxidizing action of the air, as it would be if the trellis be placed on the first layer prior to its engagement with the advancing end of the second layer. Preferably the trellis will be applied to the first layer after the latter has become sufficiently hard to support it, but our invention is broadly independent of the exact location of the trellis in the glass. Accordingly, the trellis may be more or less embedded in the first layer without departing from the practice of our invention. Our invention broadly is independent of the means of forming the glass layers.

Referring to the drawings, Figures 1 and 2 are longitudinal sections of one form of our invention showing two steps in the practice thereof; Fig. 3, a vertical section on the line 12—12 of Figs. 1 and 2; Fig. 4, a cross-section on the line 13—13 of Fig. 1; Fig. 5, a cross-section like Fig. 4 except that the heating chamber has a floor above the glass; Figs. 6 and 7, longitudinal sections showing a second form of apparatus for the practice of our invention, each view showing a different step; Figs. 8, 9, and 10, similar views showing a third form of apparatus by which our method may be practiced; and Fig. 11, a longitudinal section of a table, showing a hollow glass cooling device, parts being broken away to show the interior.

The foregoing views are not to be taken as exhausting the forms of apparatus embodying the principles of our invention, as many other varieties and types of mechanism may be devised to make wire-glass in accordance with our claims.

Referring to Figs. 1, 2, and 3, 33 is the casting table mounted on the wheels 34 and reciprocable between the housings 35 and beneath the roll 36. On the right of the roll are the guides 37 (only one being shown) and on the left, the guides 38. 39 represents a hood or retarder substantially like that shown on Fig. 4, except that at the left hand end of the hood of Figs. 1 and 2 is a flue or chimney 40, which is inclined to the right and whose front or left hand face constitutes a chute for the trellis 41. This provides a convenient means for heating the trellis before it is introduced into the glass and prevents any injurious action of the cold trellis in the glass. The trellis when cold carries more or less moisture especially in wire netting where the strands are twisted. When the wire is covered with hot glass this moisture is expelled into the neighboring glass in the form of small bubbles, which are quite perceptible near the twisted joints of the common netting. By heating the trellis we preliminarily drive off the moisture and this prevents the formation of bubbles. The roll 36 is journaled in the boxes 42 slidable vertically in the housings 35. The shaft 43 is journaled in said housings above the roll and has fixed thereon the cams 44 connected to the necks of the roll by the collars 45 on the necks of the rolls and the collars 46 on the cams, the two collars of each pair being connected together by the nuts 47 in threaded engagement with threaded extensions on the collars. The nut provides means for adjusting the distance of the roll from the table, but other means may be used for the purpose. The ends of the shaft 43 are provided with the arms or levers 48, having the holes 49 (only one being shown), which when the levers are in the position shown in Fig. 11, register with the holes 50 (only one group being shown) in the housings 35. Chains 51 are secured to the ends of the levers and carry pins 52 to be passed through the registering holes 49 and 50 to hold the levers in their lowered positions and the roll in its upper position. The pin may be passed into any of the holes 50 according to the gage of the glass to be rolled.

To make wire-glass by the mechanism shown in Figs. 1, 2, and 3, the roll is lowered, the table is placed at the extreme left and a pouring of glass made thereon at the left of the roll. The table is then moved to the right and the first layer 53 formed in the manner shown on Fig. 1, this layer passing into the hood 39. The roll is then raised and locked in its upper position, and a pouring of glass is made between the roll and the chute and on top of the trellis, which has been located as heretofore described. The table 33 is then moved to the left and the second layer 54 formed on top of the first layer 53 and the trellis 41. The chimney may, if preferred, have the holes 55 to assist in heating the trellis or the trellis may be heated in any other manner than that shown, or the chimney, or the hood and chimney may be omitted.

In Figs. 6 and 7 so far as the parts are like those on Figs. 1, 2, and 3, the same reference numerals will be used. The table, the roll 36 and the mechanism for raising and lowering it are the same as in Figs. 1, 2, and 3. In Figs. 6 and 7, a second roll 56 is employed and is adjustable by means of the screws 56' (only one shown) threaded in the frame above the roll 56, so that it may be set above the table a distance equal to the thickness of the finished wire-glass sheets. To the right of this roll are the usual guide 57 and the chute 58. To make wire-glass, the table being at the extreme left with its leading end beneath the roll 36, which is in its lowered position, as shown in Fig. 6, a pouring 59 is made to the left of the roll and the table is moved to the right until the layer 60 of glass has been finished and the rear end of the table is beneath the roll 56, when the roll 36 is raised as shown in Fig. 7 and the trellis 41 is slid down the chute 58 into contact with the end of the layer of glass to which it adheres. A pouring 61 of glass is then made to the right of the roll 56, as shown in Fig. 7, and the table moved to the left, causing the layer 54 to be spread on the layer 53 and the trellis 41.

Referring, finally, to Figs. 8, 9, and 10, we provide the casting table 62, which is movable lengthwise on the wheels 63 beneath the rolls 64 and 65, both stationary and having a guide 66 on each side thereof. The rolls are separated by a distance somewhat greater than the length of glass sheets to be rolled, and, preferably, the hood or cooling retarder 67 is placed between them. Each end of the hood is preferably provided with a flue or chimney 68, similar to that shown on Fig. 1, each hood being inclined away from its adjacent roll or toward each other from the vertical, though ordinary chutes may be used, if preferred. The rolls are mounted, and adjusted in the same manner as the roll 36 of Figs. 1, 2, 3, 6, and 7. The parts connected with the rolls 64 and 65 being the same as in said last named figures are given the same reference numerals without further description.

The operation of the devices of Figs. 8 to 10 is as follows: The table 62 being as shown in Fig. 8, a pouring 69 of glass is made on the table to the right of the roll 64, which has been lowered. The table is then moved to the left, whereby the first layer 70 is rolled, the table being stopped with the last end of this layer slightly to the left of the roll 64, the forward end not extending to the roll 65, as shown in Fig. 9. The roll 64 is now raised so as to leave a space between it and the table of the thickness of the two layers of glass; and the roll 65 is lowered so as to be separated from the table the thickness of the first layer of a sheet of wire-glass. The trellis 71 is fed down the right hand chute 68 as described and a pouring 72 of glass is made to the left of the roll 64, and another pouring 73 is made to the left of the roll 65, as shown on Fig. 9. The table being now moved to the right, the pouring 72 will be rolled to form the layer 74 on top of the first layer 70 and the trellis 71, thus making the first sheet of finished wire-glass. At the same time the layer 74 is being formed the roller 65 is forming the first layer 75 of a second sheet of wire-glass from the pouring 73 (Fig. 9). As soon as the layer 75 is completed and the sheet of wire-glass made from the layers 70 and 74 has been removed, the roll 65 is raised and the roll 64 lowered, so that the latter may form a new first layer, and the former a new second layer on top of the layer 75 (see Fig. 10). The last end of the layer 75 being slightly to the right of the roll 65, the trellis 76 is fed as described; the pourings 77 and 78 are made to the right of the rolls 64 and 65, respectively; the table is then moved to the left, causing the layer 79 to be spread by the roll 65 on the layer 75 and the trellis 76 and the layer 80 to be spread on the table by the roll, as shown on Fig. 10. This operation is repeated *ad libitum*, the lower half of one sheet and the upper half of another sheet being simultaneously formed at each actuation of the table.

In making extra heavy glass, the cooling takes place very slowly, but may be hastened by substituting a cooling fluid for the heat. In Fig. 11 we have shown a cooler which is a closed box 81 arranged over the table and having inlet and outlet pipes 82 for the cooling fluid. Other forms of cooling devices could be employed.

In Figs. 8, 9, and 10, we have shown the rock shaft 83, journaled to the housing on that side of the roll 64 and 65 opposite the chutes 68. The rock shaft has a pair of arms 84 (only one being shown) between which the finishing roll 85 is mounted. This roll is preferably smaller than the roll 64 and 65 and is designed to press wire-glass sheets sufficiently to take out the checkered appearance thereon, which is due to the trellis in the glass and to press the layers of glass tightly together, if necessary. The rock shaft 83 has the arm 86 on which is the adjustable weight 87, by which the pressure of the roller 85 can be regulated. Other regulating means may be readily devised. The roll may be held in elevated position by the pin 88 placed in the roll housing above the arm 86. The roll 85 is not an essential to our invention in all cases, but we have found it in practice to improve the quality of the product where the surface is for any reason irregular or the layers do not unite evenly throughout. The roll 36 in Figs. 6 and 7 may be located during the second step shown on Fig. 7 as engaging the surface of the glass and performing the function of a finishing roll. A finishing roll may readily be applied to the remaining forms of our invention. By the use of a finishing roll which may be a roller independent of the roll 36, we are able to press the sheets sufficiently to take out the checkered appearance thereon, which is due to the trellis in the glass and we are able to press the two layers of glass more closely together, but we do not regard a finishing roll as an essential in all cases.

While we have described the various forms of our invention with considerable detail, we do not desire to be restricted to the same or to the described combinations of the same. The cooler, the hoods or any equivalent cooling retarder may be omitted; the preliminary heating of the trellis may not always be necessary; the adjustments and the raising of the rolls may be variously effected; the directions of motion of the rolls and table may be reversed from those described; and the guides may be modified.

The tables and rolls shown may be cooled in any approved manner.

The term "wire-glass" is a trade term and includes glass having therein not only wire but any metallic open work, whether of wire or not. We use the word trellis in the claims to cover generically any metal open work suitable for the making of wire-glass.

Having described our invention, we claim—

1. The method of forming glass sheets, which consists in spreading in one direction on a bed or table a layer of glass, spreading another layer of glass in the opposite direction over and upon the layer first spread, and simultaneously with the forming of the second layer interposing a metallic netting between the two layers.

2. In an apparatus for forming glass sheets from a plurality of layers of glass, a pair of rollers one behind the other for successively rolling in opposite directions the superposed layers of glass, the rollers being separated a sufficient distance to form a pouring space, one of the rollers being adjusted at a higher level than the other to roll a second layer of glass upon the first layer.

3. In an apparatus for forming glass sheets from a plurality of layers of glass, a pair of rollers one behind the other for successively rolling in opposite directions the superposed layers of glass, the rollers being separated a sufficient distance to form a pouring space, one roller being adjusted to roll a second layer of glass upon the first layer, and means for interposing a metallic netting between the layers.

4. In an apparatus, a table and a pair of rolls spaced apart over the table to permit glass to be poured between them, one of said elements being movable backwards and forwards whereby one roll may roll one layer of glass in one direction and a second layer on the first layer in the opposite direction.

5. In an apparatus for making glass sheets with metallic trellis therein, means for forming a layer of glass means for retarding the cooling thereof, means for forming on said layer a second layer of glass, and means for introducing a metallic trellis into the glass during its formation.

6. In an apparatus for making glass sheets with metallic trellis therein, means for forming a layer of glass, a hood at the rear of the layer-forming means, through which the layer is passed to retard its cooling, means for forming on said layer a second layer of glass, and means for introducing a metallic trellis into the glass during its formation.

7. In an apparatus for making glass sheets with metallic trellis therein, means for forming a layer of glass, means for retarding the cooling of the same, means for forming on said layer a second layer of glass, and means for introducing a metallic trellis into the glass during its formation.

8. In an apparatus for making glass sheets with metallic trellis therein, means for forming a layer of glass means for forming a layer of glass thereon, a heater to retard the cooling of the first layer and a combined flue for said heater and chute for the metallic trellis.

Signed at Pittsburg this first day of April, 1905.

JAMES RAMSEY SPEER.
JAMES RICHARDSON TAYLOR.

Witnesses:
ALICE A. TRILL,
GEO. H. HARVEY.